(12) United States Patent
Thomas et al.

(10) Patent No.: US 6,254,375 B1
(45) Date of Patent: *Jul. 3, 2001

(54) MATRIX AND PROCESS FOR THE PRODUCTION OF A PACKAGE TROUGH HAVING AN UNDERCUT

(75) Inventors: Ulrich Thomas, Breidenbach-Oberdieten; Rolf Blöcher, Breidenbach, both of (DE); Celestino Inverardi, Corzano (IT)

(73) Assignee: Tiromat Kramer & Grebe GmbH & Co., KG, Biedenkopf-Wallau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/317,470

(22) Filed: May 24, 1999

(30) Foreign Application Priority Data

Jun. 2, 1998 (DE) .................................. 198 24 588

(51) Int. Cl.⁷ .......................... A01J 21/00; B65B 47/02
(52) U.S. Cl. .......................... 425/403; 53/559; 425/441; 425/58
(58) Field of Search .................... 53/329, 329.2, 53/329.3, 329.4, 329.5, 478, 453, 485, 559, 370.7; 425/483, 58, 438, 403, 441

(56) References Cited

U.S. PATENT DOCUMENTS

| | | | | |
|---|---|---|---|---|
| 4,372,098 | * | 2/1983 | Mason | 53/453 |
| 5,014,500 | * | 5/1991 | Robache | 53/559 |
| 5,241,801 | * | 9/1993 | Nelson | 53/329.2 |
| 5,307,610 | * | 5/1994 | Schneider et al. | 53/559 |
| 5,477,660 | * | 12/1995 | Smith | 53/559 |

FOREIGN PATENT DOCUMENTS

| | | | |
|---|---|---|---|
| 690 03 880 T2 | 4/1994 | (DE) . | |
| 0 538 570 A1 | 4/1993 | (EP) . | |
| 2-45322 | * | 2/1990 | (JP) .......... 53/329 |

* cited by examiner

Primary Examiner—Stephen F. Gerrity
Assistant Examiner—Sam Tawfik
(74) Attorney, Agent, or Firm—Akin, Gump, Strauss, Hauer & Feld, L.L.P.

(57) ABSTRACT

The present invention relates to a matrix for the production of a package trough having at least one undercut, consisting of a bottom part, side parts oriented transversely and side parts oriented parallel to the direction of package trough feed, wherein at least one side part oriented parallel to the direction of feed serves as a mold for the undercut, and wherein said side part is fixed in its spatial position in relation to the machine frame whereas the other parts of the matrix can be displaced vertically downwards.

10 Claims, 8 Drawing Sheets

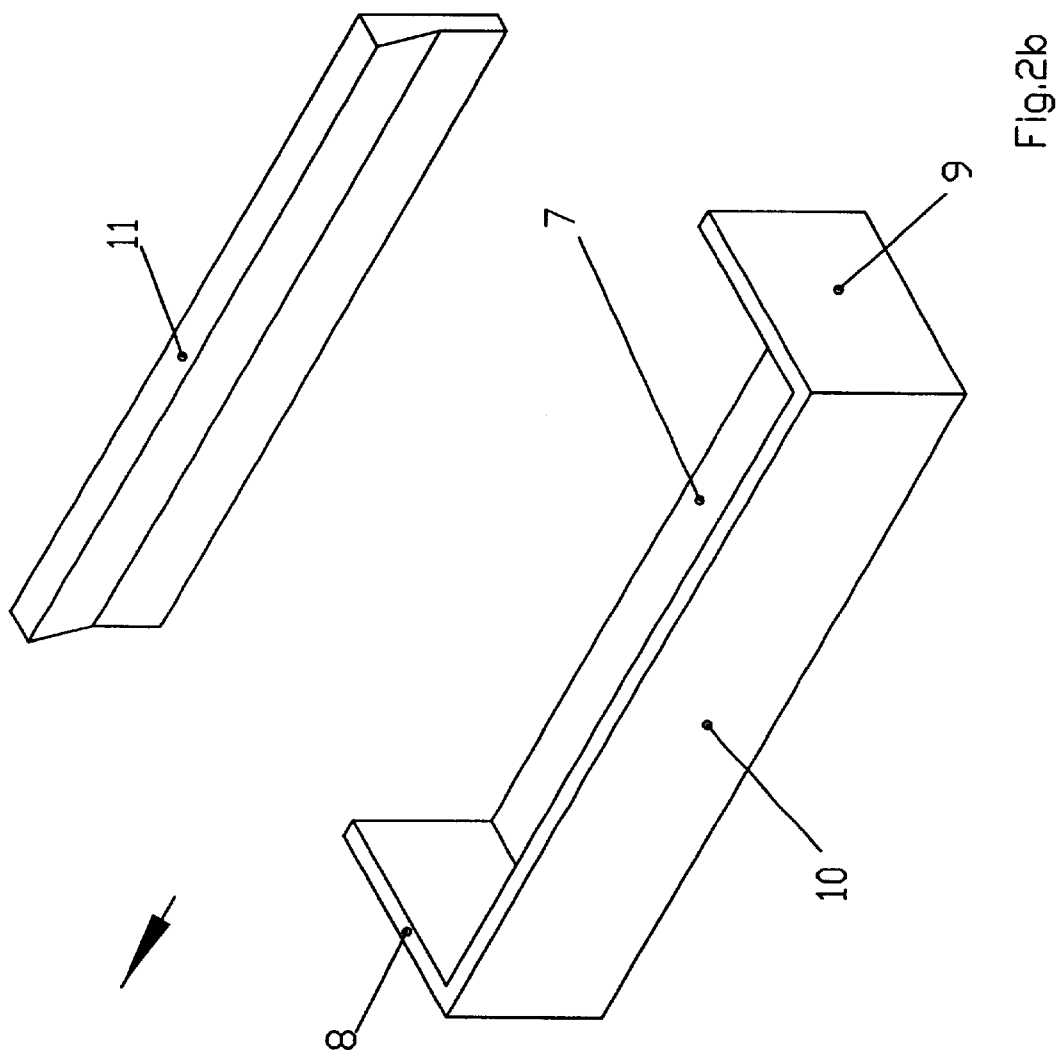

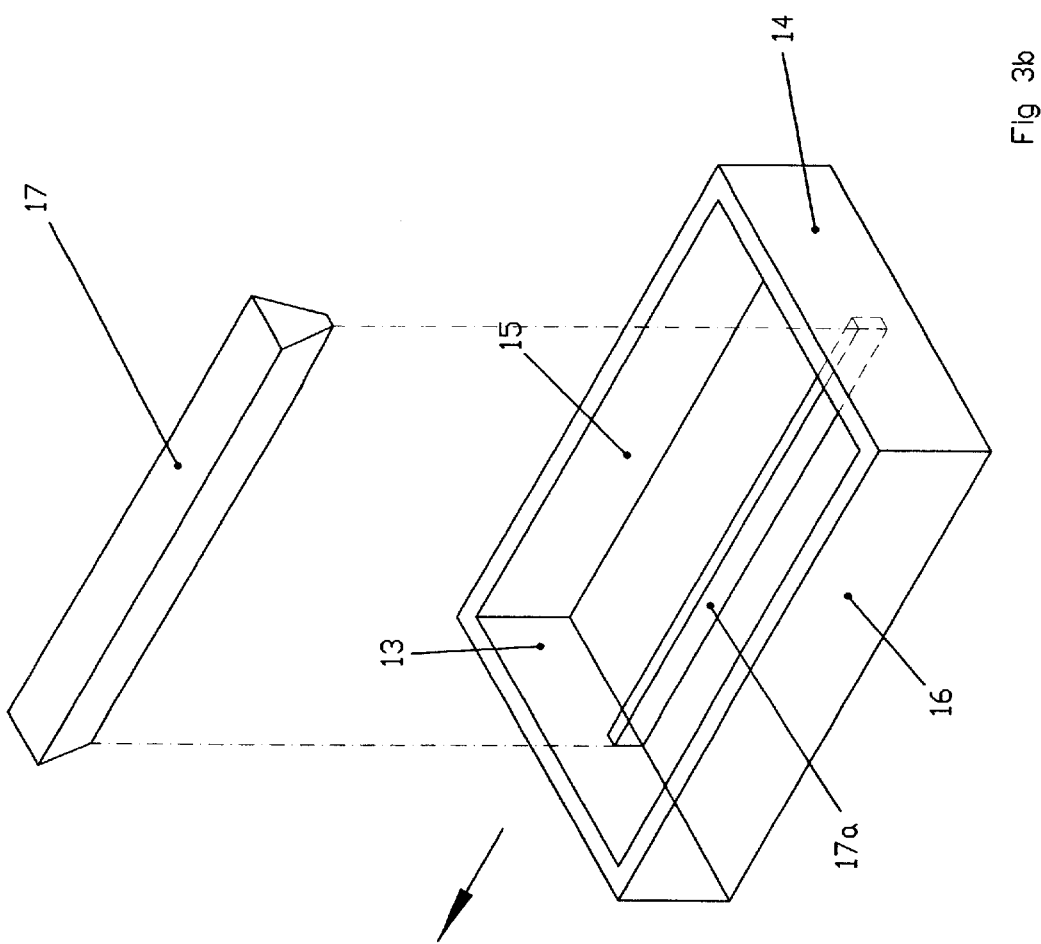

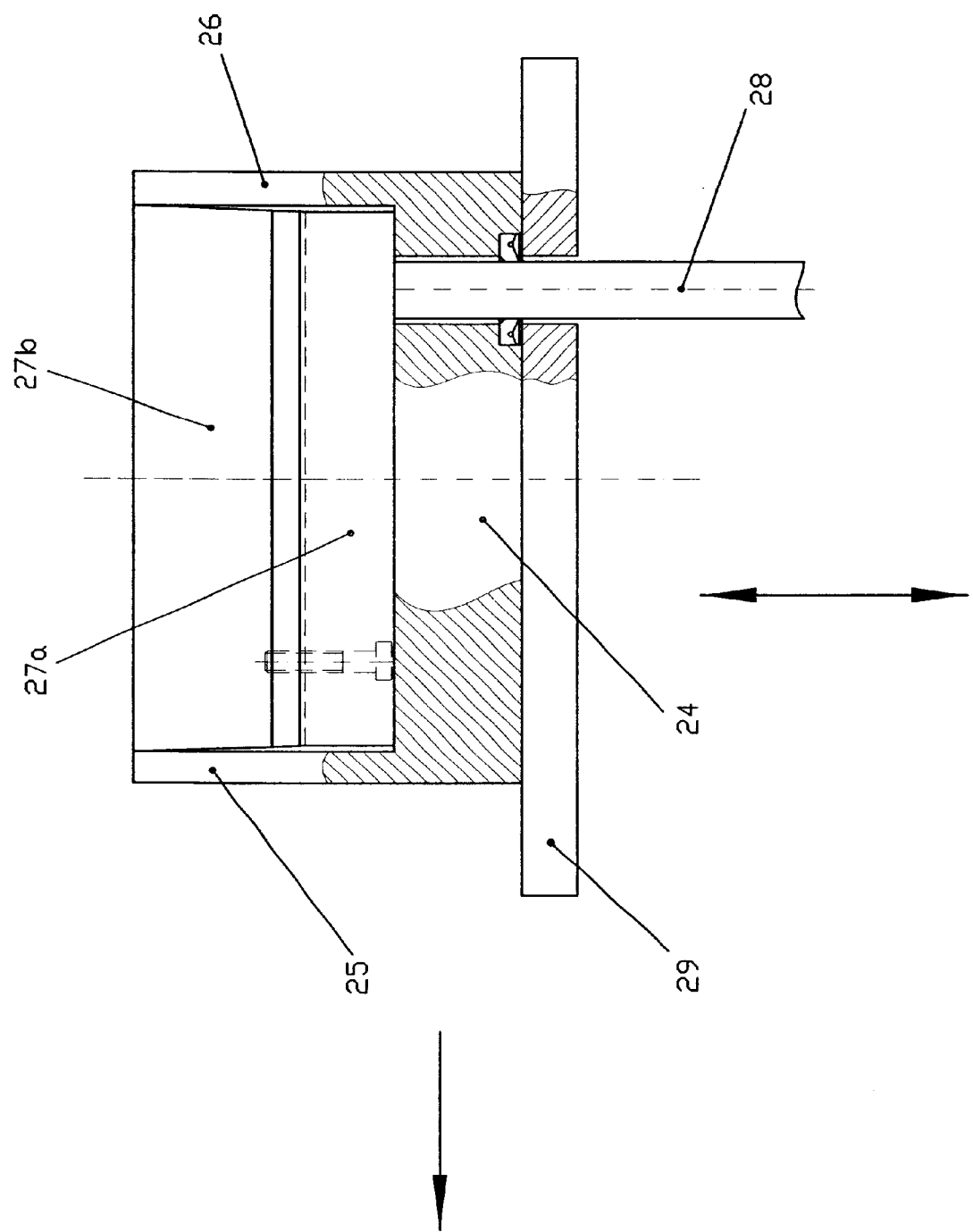

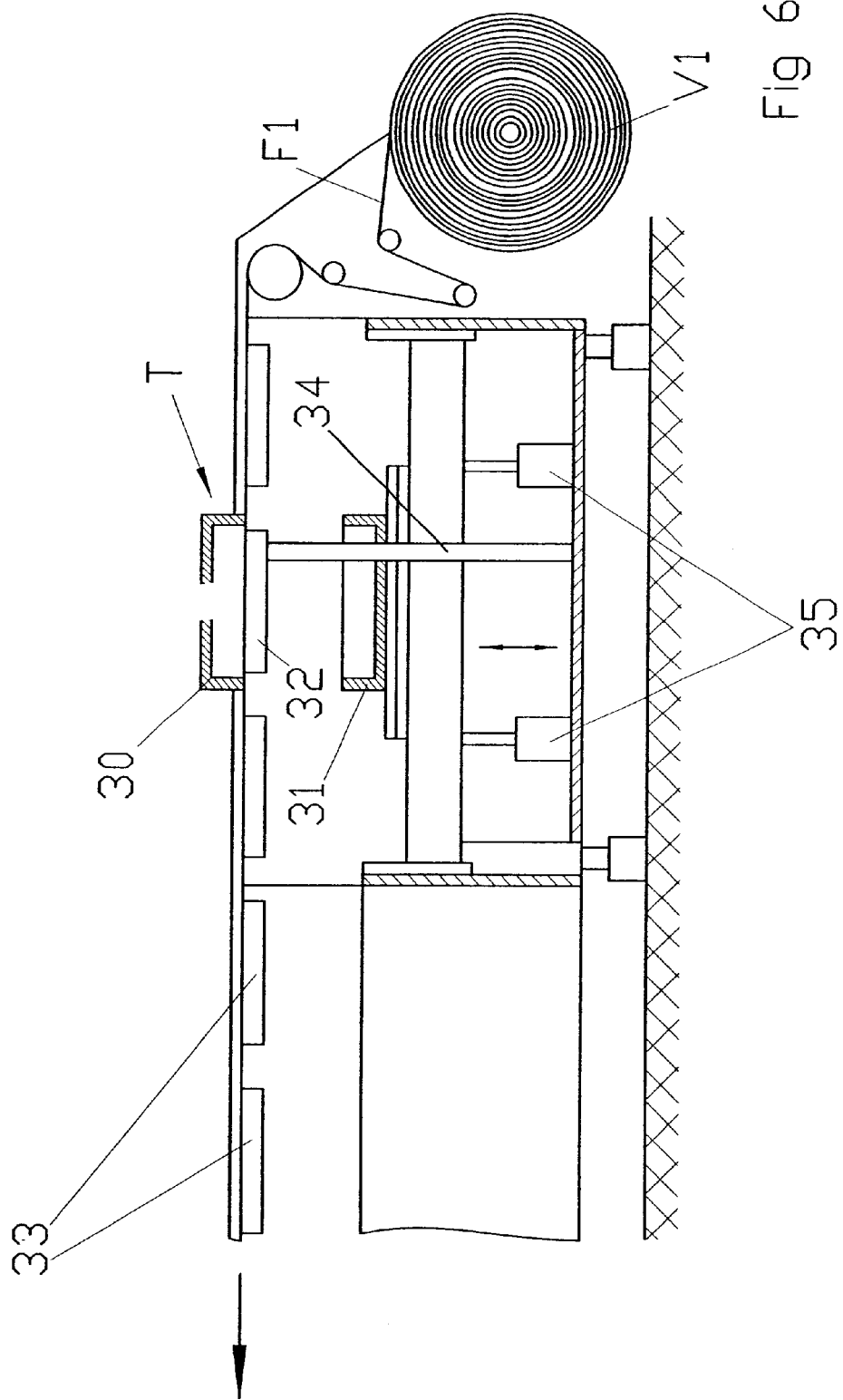

MATRIX AND PROCESS FOR THE PRODUCTION OF A PACKAGE TROUGH HAVING AN UNDERCUT

BACKGROUND OF THE INVENTION

The present invention relates to a matrix and a process for the production of a package trough having at least one undercut.

Packages, particularly for foods, are becoming increasingly important today. The foods are placed in a so-called package trough and the package trough is then closed with a covering film.

As a rule, the package troughs are semi-continuously produced in so-called deep drawing stations of packaging machines. To this end, a film from which the package trough is produced is fed over a matrix of the deep drawing station, fixed there, optionally heated and then deep-drawn into the matrix using pressure, for example. The matrix is then lowered and the finished package trough is released from the matrix. As soon as the matrix has been lowered such that it is beneath the freshly produced package trough, the latter is moved on by the length of one package trough. The matrix is then raised again and the next package trough is deep-drawn.

For the packaging industry, so-called stand-up packages are of very special interest because they do not lie flat on the shelf but stand upright and thus provide a large presentation surface. Stand-up packages do not rest on the underside of the package trough but stand on a narrow side part of the package trough, i.e. the covering film on this package is roughly perpendicular to the bearing surface on which the package stands. For these packages, the package trough must have, in addition to the cut edge, a second standing surface on which the stand-up package firmly stands. This standing surface can be realized, for instance, in the form of an undercut whose lowest point must be on roughly the same level as the cut edge and thus does not tip backwards when it stands on its side.

However, such an undercut creates difficulties during the mold release of the package trough from the matrix after deep drawing because the undercut of the package trough is pressed against the matrix when the latter is lowered, thereby being either dented or even destroyed.

Therefore, a number of attempts have been made to provide devices for the production of package troughs having an undercut wherein the undercut is not damaged during mold release. EP 0,538,570, for example, teaches that the matrix during release is guided not vertically downwards but parallel to the tilted side face of the undercut. In this way it is possible to produce package troughs having undercuts transverse to the direction of package trough feed. The disadvantage of this procedure is that the movement of the matrix during release can only be realized with a relatively complex drive. Furthermore, this device can only be used for producing package troughs having an undercut transverse to the direction of package trough feed.

SUMMARY OF THE INVENTION

The object is therefore to provide a device which allows the production of a package trough having at least one undercut and does not have the disadvantages of prior art.

According to the invention, said object is achieved by providing a matrix for the production of a package trough having at least one undercut, which matrix consists of one bottom part, two side parts oriented transversely and two side parts oriented parallel to the direction of package trough feed and on which at least one of the side parts oriented parallel to the direction of feed serves as a mold for the undercut, and on which this side part is fixed in its spatial position in relation to the machine frame whereas the other parts of the matrix are vertically lowerable.

The side part which serves as mold for the undercut tapers essentially from the top of the matrix towards the bottom.

Both of the side parts oriented parallel to the direction of feed serve preferably as a mold for an undercut so that a package trough having two undercuts can be produced. These side parts are then both fixed in their spatial position in relation to the machine frame.

In another preferred embodiment, the side parts which serve as a mold for the undercut are interrupted by one or more webs which do not taper downwards, so that no undercut is produced in the package trough at these points.

In yet another preferred embodiment, the side parts remaining unchanged in their position in relation to the machine frame have a surface with a low coefficient of friction on their top. This surface can be either polished or coated with Teflon or a similar material.

In order to deep-draw the film with a vacuum into the matrix, the joints between the side parts forming the undercuts, and the other parts of the matrix adjacent to these side parts are preferably sealed.

A matrix is preferably used for the production of at least two package troughs. In addition to the bottom part, the side parts oriented transversely and the side parts oriented parallel to the direction of package trough feed, such a matrix has preferably at least one middle part which tapers preferably on both sides from the top of the matrix towards the bottom and is fixed in its spatial position in relation to the machine frame.

The side parts of such a matrix are also preferably formed in such a way that they can be used for the production of undercuts and are then also fixed in their spatial position in relation to the machine frame.

The middle parts and optionally the side parts which serve as a mold for an undercut are preferably interrupted by webs which do not taper downwards, so that no undercut is produced in the package trough at these points.

In another preferred embodiment, the middle parts and the side parts remaining unchanged in their spatial position in relation to the machine frame have a surface with a low coefficient of friction on their top. This surface can be either polished or coated with Teflon or a similar material.

In order to deep-draw the film with a vacuum into the matrix, the joints between the middle parts and optionally between the side parts forming the undercuts, and the other parts of the matrix adjacent to these side parts or middle parts are preferably sealed.

Another object of the present invention is to provide a process for the production of package troughs which does not have the disadvantages of prior art.

According to the invention, said object is achieved by Providing a process for the production of a package trough having at least one undercut, using the matrix according to the invention, wherein the film from which the package trough is produced is fed over the matrix, optionally heated and formed into the matrix, the vertically displaceable parts of the matrix are lowered, and the finished package trough is moved on.

Heating of the film may also be effected upstream the deep drawing station.

In a preferred embodiment, the film is pressed with a die into the matrix and preformed therewith it and then finally formed using compressed air above the film and/or a vacuum beneath the film.

It is also preferred to deep-draw the film into the matrix using only compressed air above the film or only a vacuum beneath the film or a combination of pressure and vacuum.

The advantage of the present invention is that a package trough can be produced with one or more undercuts oriented parallel to the direction of package trough feed. By combining the features of the present invention with the features of the deep drawing station according to EP 0,538,570, it is even possible to provide the package trough with an additional undercut oriented transversely to the direction of package trough feed. The matrix according to the invention can be produced inexpensively, and the process according to the invention is easy to perform.

BRIEF DESCRIPTION OF THE DRAWINGS

The invention will be illustrated in the following with reference to FIGS. 1 to 6. This is merely an explanation by way of example and thus does not limit the invention.

FIGS. 2a and 2b show a matrix according to the invention for the production of one package trough.

FIGS. 3a and 3b show a matrix according to the invention for the production of two package troughs.

FIG. 5 shows a lowering mechanism for the matrix.

FIG. 6 shows a deep drawing station with the matrix according to the invention.

FIG. 1 shows a so-called stand-up package 1. The package 1 consists of a package trough 2 and a covering film 3. The stand-up package is standing on its cut edge 4 and has an undercut 5 in order to stabilize the package in its position roughly perpendicular to the surface on which it is standing.

FIG. 2a shows the matrix 6 according to the invention. The matrix serves as a mold for the production of the package trough having an undercut. The matrix has a bottom part 7, side parts 8,9 oriented transversely and side parts 10, 11 oriented parallel to the direction of package trough feed. The arrow shows the direction of feed of the finished package troughs. The side part 11 is thicker at the top than at the bottom so that it can serve as a mold for the undercut in the package trough. If a package trough is to be produced with two undercuts, the side part 10 can also be designed in the same way as the side part 11.

FIG. 2b shows the matrix of FIG. 2a after lowering. After deep drawing, the parts 7, 8, 9, 10 of the matrix are lowered and the resultant package trough is released at the same time whereas the side part 11 is not lowered, but remains fixed in its spatial position so that the undercut formed by the side part 11 is not damaged. The resultant package trough can be fed on in the direction of the illustrated arrow, parallel to the side part 11, without damage being caused to the undercut.

FIG. 3a shows a matrix according to the invention for the production of two package troughs. In addition to the bottom part 12, the side parts 13, 14 oriented transversely and side parts 15, 16 oriented parallel to the direction of package trough feed, this matrix has the middle parts 17, 17a. The middle part 17 tapers downwards on both sides in such a way that it can serve as a mold for the undercuts of both package troughs. The middle part 17a has a constant cross section. A person skilled in the art immediately recognizes that the middle parts 17, 17a can also be produced as a single part. Of course, the side parts 15 and 16 can also be formed so as to serve as a mold for undercuts.

FIG. 3b shows the matrix of FIG. 3a after lowering. After deep drawing, the parts 12, 13, 14, 15, 16, and 17a of the matrix are lowered and the resultant package trough is released at the same time whereas the side part 17 is not lowered but remains fixed in its spatial position so that the undercuts formed by the middle parts 17 and 17a are not damaged. The resultant package troughs can be fed on in the direction of the illustrated arrow, parallel to the middle part 17, without damage being caused to the undercuts of the package troughs.

FIG. 4 shows a matrix according to the invention for the production of two package troughs, wherein the middle part is interrupted by webs. This matrix also has a bottom part 18, the side parts 19, 20 oriented transversely and side parts 21, 22 oriented parallel to the direction of package trough feed. Moreover, this matrix has a middle part consisting of the parts 23a and 23b and the web 23c. Whereas the parts 23a and 23b taper downwards, the web 23c has a parallel cross section so that the parts 23a and 23b form undercuts which are separated by a section without an undercut. In this embodiment, only the parts 23a and 23b have to be fixed in their spatial position whereas all the other parts of the matrix are vertically lowerable. In this embodiment as well, the side parts 21 and/or 22 can serve as mold for undercuts.

FIG. 5 shows the matrix according to the invention for the production of two package troughs with the associated lowering mechanism. Of the matrix, the bottom part 24 and the side parts 25 and 26 oriented transversely to the direction of package trough feed are visible. The middle part of the matrix, consisting of two parts 27a and 27b, is also visible. Whereas the part 27a has a constant cross section, the part 27b tapers downwards so that package troughs having an undercut can be formed with the middle part. The part 27b is screwed onto the part 27a so that the shape of the undercut can be modified without major assembly effort. The middle part is fastened to a rod 28, which in turn is permanently connected to the machine frame (not illustrated) so that the middle part as a whole is fixed in its spatial position in relation to the machine frame. The bottom part of the matrix 24 is mounted on a plate 29 which has a drive (not illustrated) moving it vertically up and down, as indicated by the double-ended arrow. The plate 29 has a boring through which the rod 28 is guided.

Figure 1:
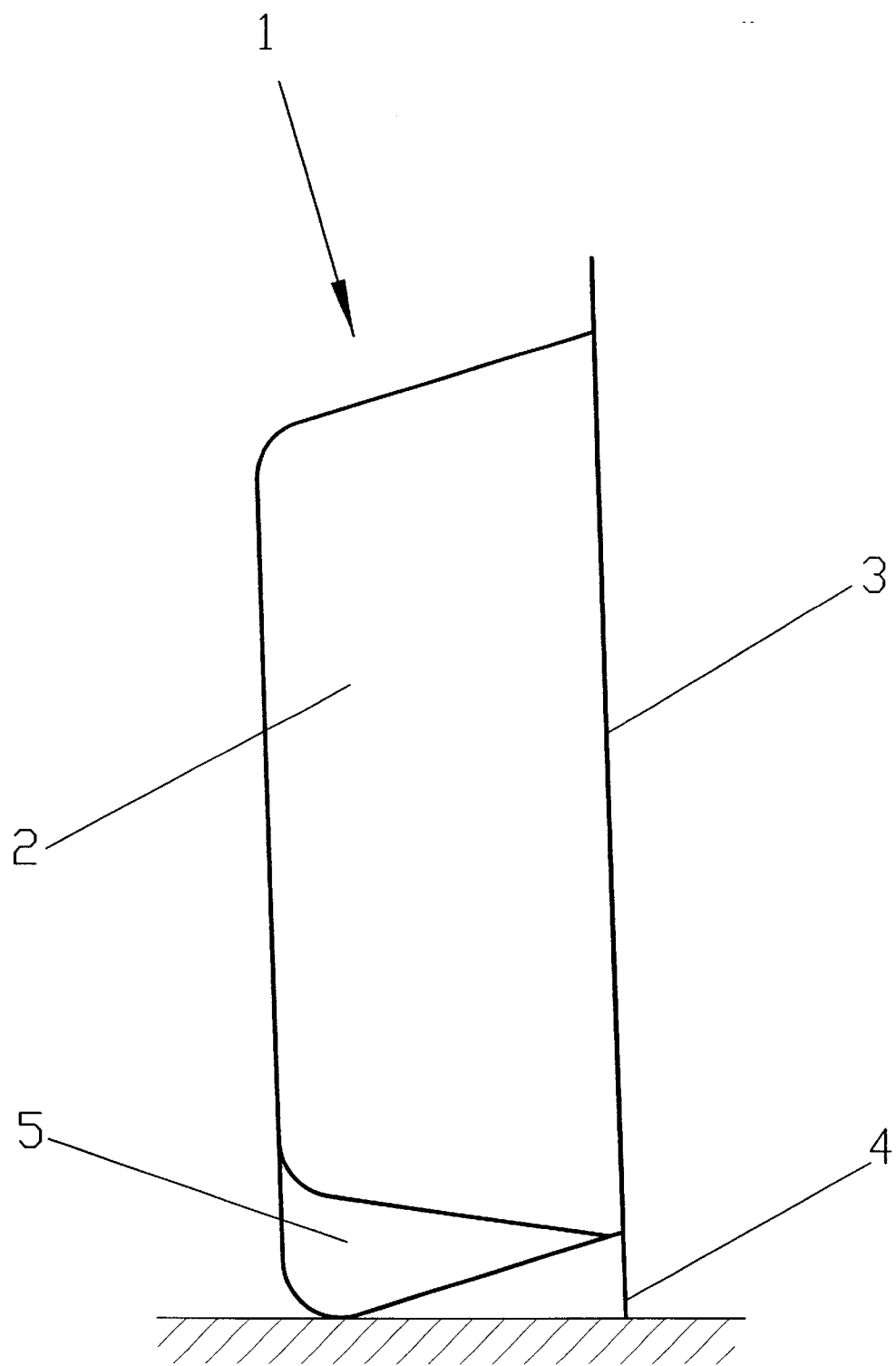
FIG. 1 shows a stand-up package.
Figure 2A:
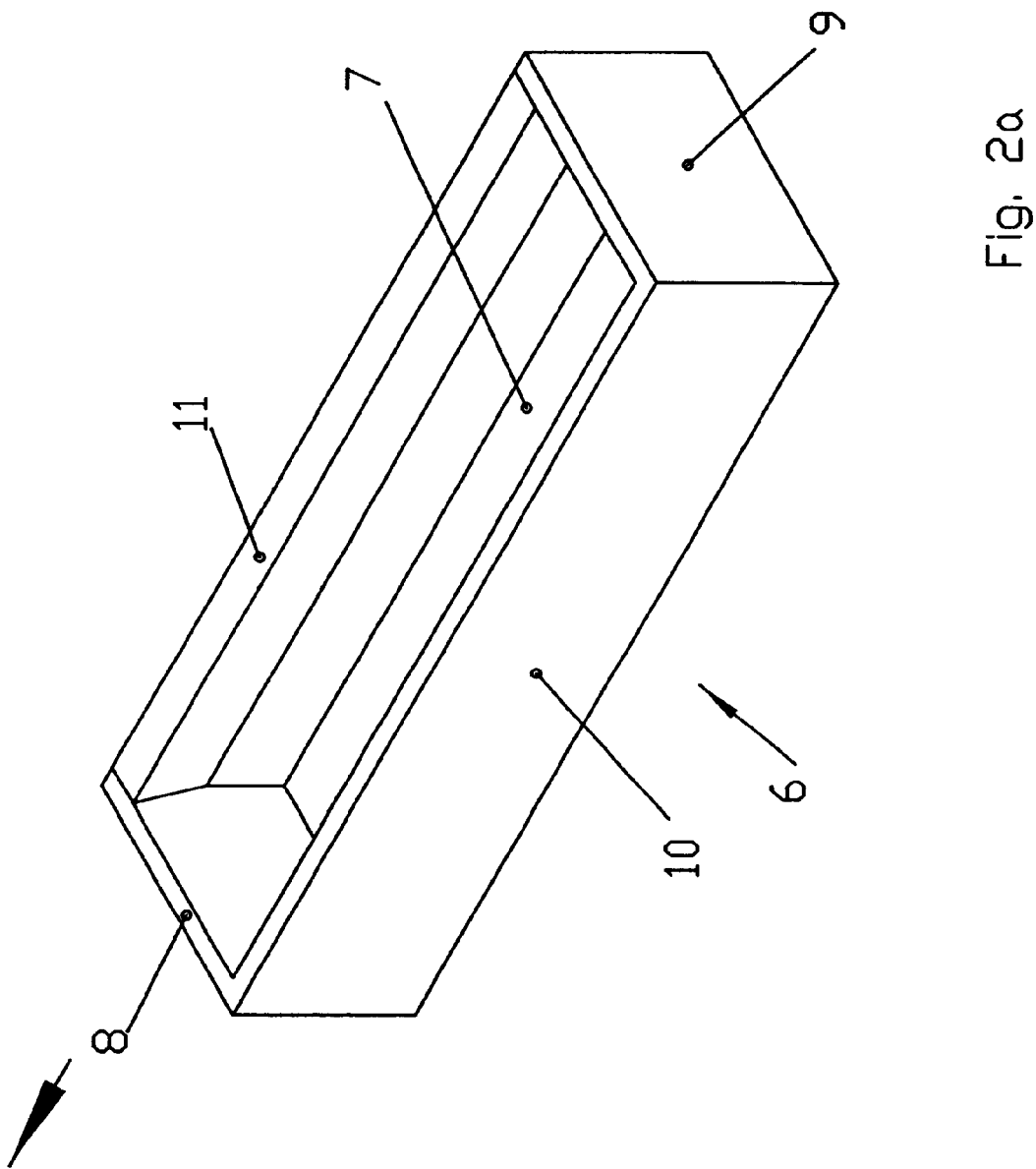
Figure 3A:
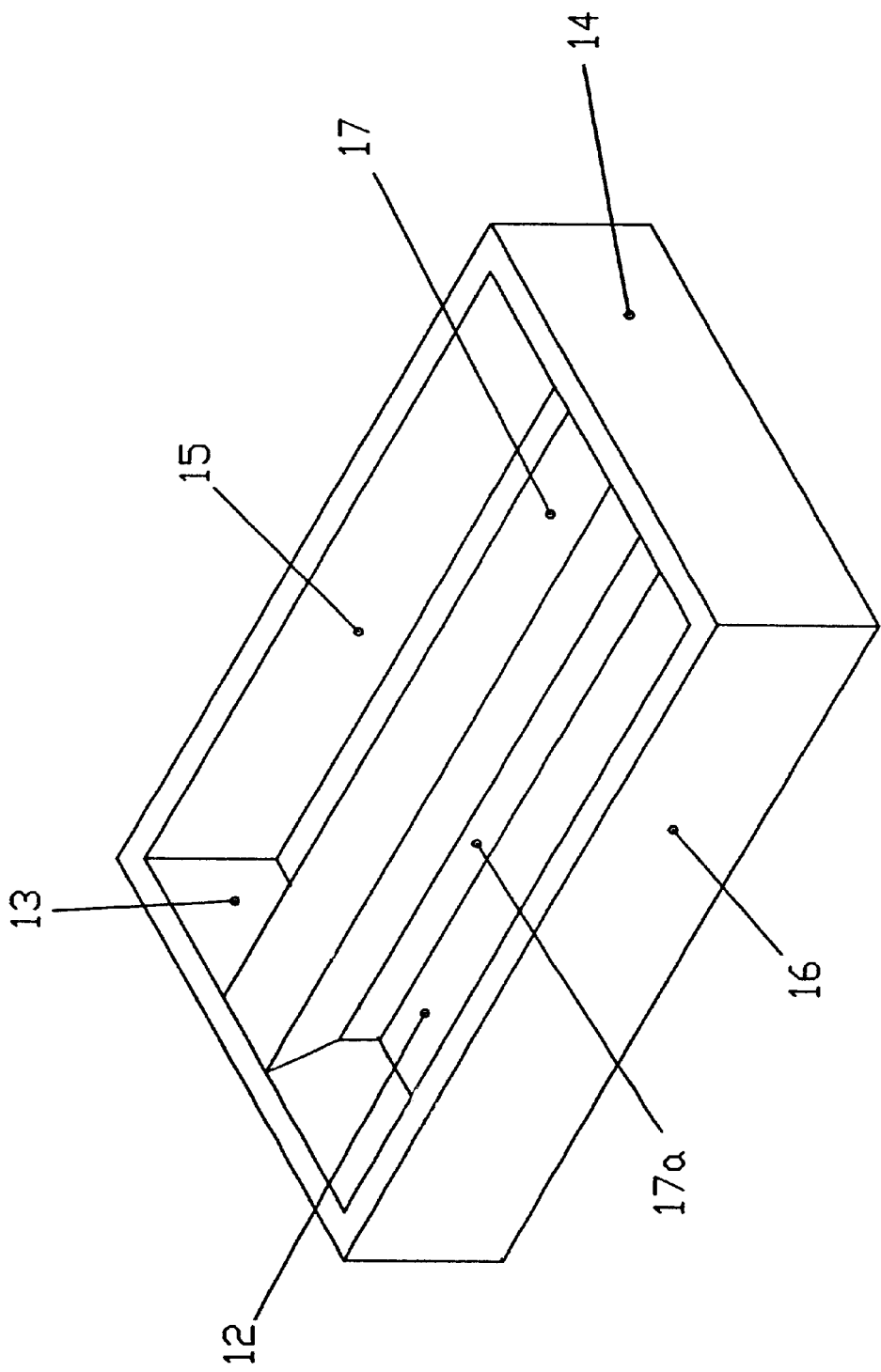
Figure 4:
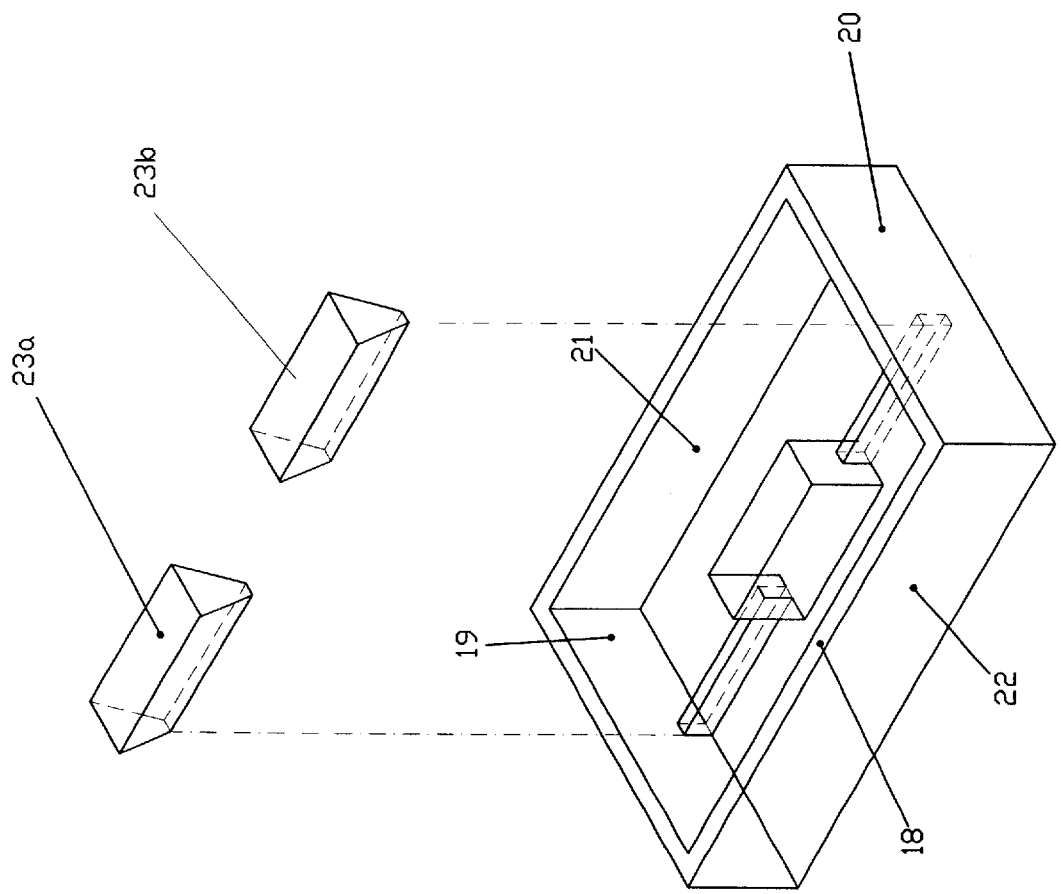
FIG. 4 shows a matrix according to the invention for the production of two package troughs, wherein the middle part is interrupted by webs.

If the side parts oriented parallel to the direction of feed are also used for forming undercuts, they are likewise fixed with rods in their position in relation to the machine frame. A person skilled in the art will recognize that the middle part can also be fixed in any other way.

FIG. 6 shows a deep-drawing station according to the invention. The film F1, which is unrolled from the roll V1, is fed by a chain drive to the deep drawing station T. There the film is fixed and heated with heating elements 30; however, heating of the film may also be effected upstream the deep drawing station. At this moment, the matrix is directly beneath the film. The film is then deep-drawn with pressure or a vacuum into the matrix, thus producing the package trough. After deep drawing, the vertically displaceable parts of the matrix are lowered again by the drives 35 and the package trough is released from the matrix at the same time. The spatial position of the middle part 32 is fixed with a rod 34. After the lowering of the vertically displaceable parts of the matrix 31, the film and thus the freshly produced package trough is fed on and then the vertically displaceable parts of the matrix are raised again and the process of producing the package trough can be repeated.

We claim:

1. A matrix (6) for producing a package trough (1) having at least one undercut (5), the matrix being operably connected to a machine frame and comprising: a bottom part (7), a first plurality of side parts (8, 9) disposed on the bottom part and oriented transversely to a direction of package trough feed, and a second plurality of side parts (10, 11) oriented parallel to the direction of package trough feed and disposed on the bottom part (7), at least one of the second plurality of side parts is configured to provide a mold fur the at least one undercut of the package trough, the at least one of the second plurality of side parts being removably disposed on the bottom part and being capable of being maintained in position relative to the machine frame after the production of at least a portion of the package trough while the first plurality of side parts and any remaining second plurality of side parts of the matrix (6, 31) can be displaced vertically downwards relative to the machine frame.

2. The matrix according to claim 1 wherein the second plurality of side parts (10, 11) serve as a mold for two undercuts, so that the package trough has one undercut on each of two opposite sides, the second plurality of side parts being removably disposed on the bottom part and are capable of being maintained in position relative to the machine frame after at least a portion of the package trough has been formed while the first plurality of side parts can be displaced vertically downwards relative to the machine frame.

3. The matrix according to claim 2 wherein at least one web having a constant cross section is interposed between the second plurality of side parts (10, 11).

4. The matrix according to claim 1 wherein the second plurality of side parts (10, 11) have a low-friction surface.

5. The matrix according to claim 1 wherein the second plurality of side parts (10, 11) are sealed to the other parts of the matrix.

6. A matrix for producing a package trough having at least one undercut, the matrix being operably connected to a machine frame and comprising: a bottom part (12), a first plurality of side parts (13, 14) disposed on the bottom part and oriented transversely relative to a direction of package trough feed, a second plurality of said parts (15, 16) disposed on the bottom part and oriented parallel to the direction of package trough feed, and at least one middle part (17) removably disposed on the bottom part and capable of being maintained in position relative to the machine frame after the formation of at least a portion the package trough while a remaining portion of the matrix is movable vertically downwards with respect to the machine frame.

7. The matrix according to claim 6 wherein at least one of the second plurality of side parts serves as a mold for the at least one undercut, is removably disposed on the bottom part, and is capable of being maintained in position relative to the machine frame after the formation of at least a portion of the package trough while the remaining portion of the matrix is movable vertically downwards with respect to the machine frame.

8. The matrix according to claim 6 wherein the at least one middle part comprises at least two middle parts having at least one web interposed therebetween, the at least one web having a constant cross section.

9. The matrix according to claim 6 wherein the at least one middle part has a low-friction surface.

10. The matrix according to claim 6 wherein the at least one middle part (17) is sealed to the other parts of the matrix.

* * * * *